United States Patent [19]
Sexton

[11] Patent Number: 5,086,480
[45] Date of Patent: Feb. 4, 1992

[54] VIDEO IMAGE PROCESSING

[75] Inventor: Graham G. Sexton, Felixstowe, England

[73] Assignee: British Telecommunications public limited company, London, England

[21] Appl. No.: 594,670

[22] Filed: Oct. 5, 1990

Related U.S. Application Data

[63] Continuation of Ser. No. 295,214, Jan. 5, 1989, abandoned.

[30] Foreign Application Priority Data

May 6, 1987 [GB] United Kingdom ................ 870737
May 6, 1988 [GB] United Kingdom..PCT/GB88/00357

[51] Int. Cl.$^5$ ............................................. G06K 9/46
[52] U.S. Cl. ...................................... 382/18; 382/9; 382/34; 382/56; 358/126; 358/135
[58] Field of Search ............... 358/126, 135, 136; 382/9, 18, 34, 56

[56] References Cited

U.S. PATENT DOCUMENTS

| | | | |
|---|---|---|---|
| 3,761,613 | 9/1973 | Limb | 178/7.1 |
| 3,805,238 | 4/1974 | Rothfjell | 382/2 |
| 4,119,946 | 10/1978 | Taylor | 340/146.3 |
| 4,295,121 | 10/1981 | Enser et al. | 340/146.3 |
| 4,334,241 | 6/1982 | Kashioka et al. | 382/8 |
| 4,613,894 | 9/1986 | Catros et al. | 358/13 |
| 4,625,329 | 11/1986 | Ishikawa et al. | 382/1 |
| 4,700,401 | 10/1987 | Masatsugu et al. | 382/34 |

FOREIGN PATENT DOCUMENTS 0225729 6/1987 European Pat. Off. .

OTHER PUBLICATIONS

IEEE International Conference on Acoustics, Speech and Signal Processing, ICASSP 82, Proceedings, 3-5 May 1982, Paris, FR, vol. 1 or 3, IEEE (U.S.), A. Gersho et al: "Image Coding Using Vector Quantization", pp. 428-431.

IEEE International Conference on Communications, ICC '84, Links for the Future, Science, Systems & Services for Communications, 14-17 May 1984, Amsterdam, NL, vol. 1, C. M. Lin et al.: "Motion Compensated Inerframe Color Image Coding", pp. 516-520.

IEEE International Conference on Communications, Jun. 1982, vol. 1, (Philadelphia, U.S.), F. May et al.: "Picture Coding with Motion Analysis for Low Rate Transmission", pp. 2G, 7.1-2G, 7.5.

The Radio & Electronics Engineer, vol. 48, No. 6, Jun. 1978, Institution of Electronics and Radio Engineers, (London, GB) R. C. Nicol: "Interfacing Intraframe d.p.c.m. with Conditional Replenishment Coding for Viewphone Signals", pp. 277-284.

Reconnaissance des Formes et Traitement des Images, congres AFCET-IRIA, vol. 2, Feb. 1978, (Paris, FR), G. E. Lowitz: Compression des donnees images par reconnaissance des formes et clustering:—pp. 699-714.

*Primary Examiner*—Michael Razavi
*Attorney, Agent, or Firm*—Nixon & Vanderhye

[57] ABSTRACT

A video coder automatically identifies the head area from a head against a background scene.

Identification involves: storing several frames of an image training sequence (1); taking the difference between adjacent frames (2); for all the picture elements (pels) represented by each set of difference data, thresholding the pels against a luminance threshold (3); applying median filtering to the data sets thus obtained (4); then clustering the data sets (5); determining the minimum rectangle which will contain all the remaining non-zero pels represented by each set (6); generating a border of finite thickness around the rectangles (7); generating a head codebook from the pels of the original frames of the image that correspond to the pels represented by the respective sets of data that fall within the respective borders (8), similarly generating a background codebook; and finally generating a composite codebook.

21 Claims, 5 Drawing Sheets

Fig. 2.a.
Fig. 2.b
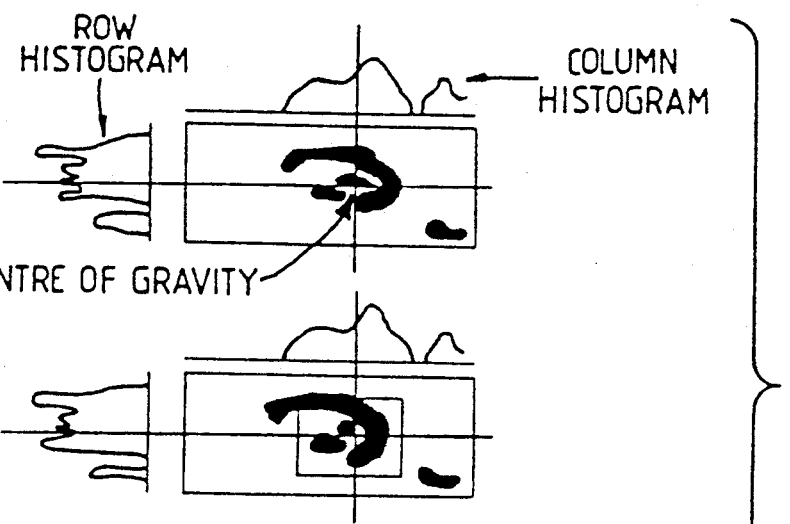
Fig. 2.c
Fig. 2.d
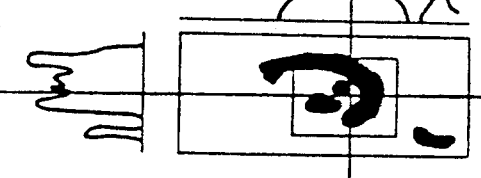
Fig. 2.e
Fig. 2.f
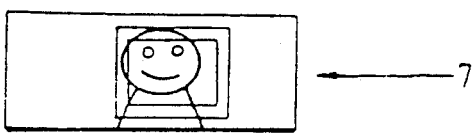
Fig. 2.g

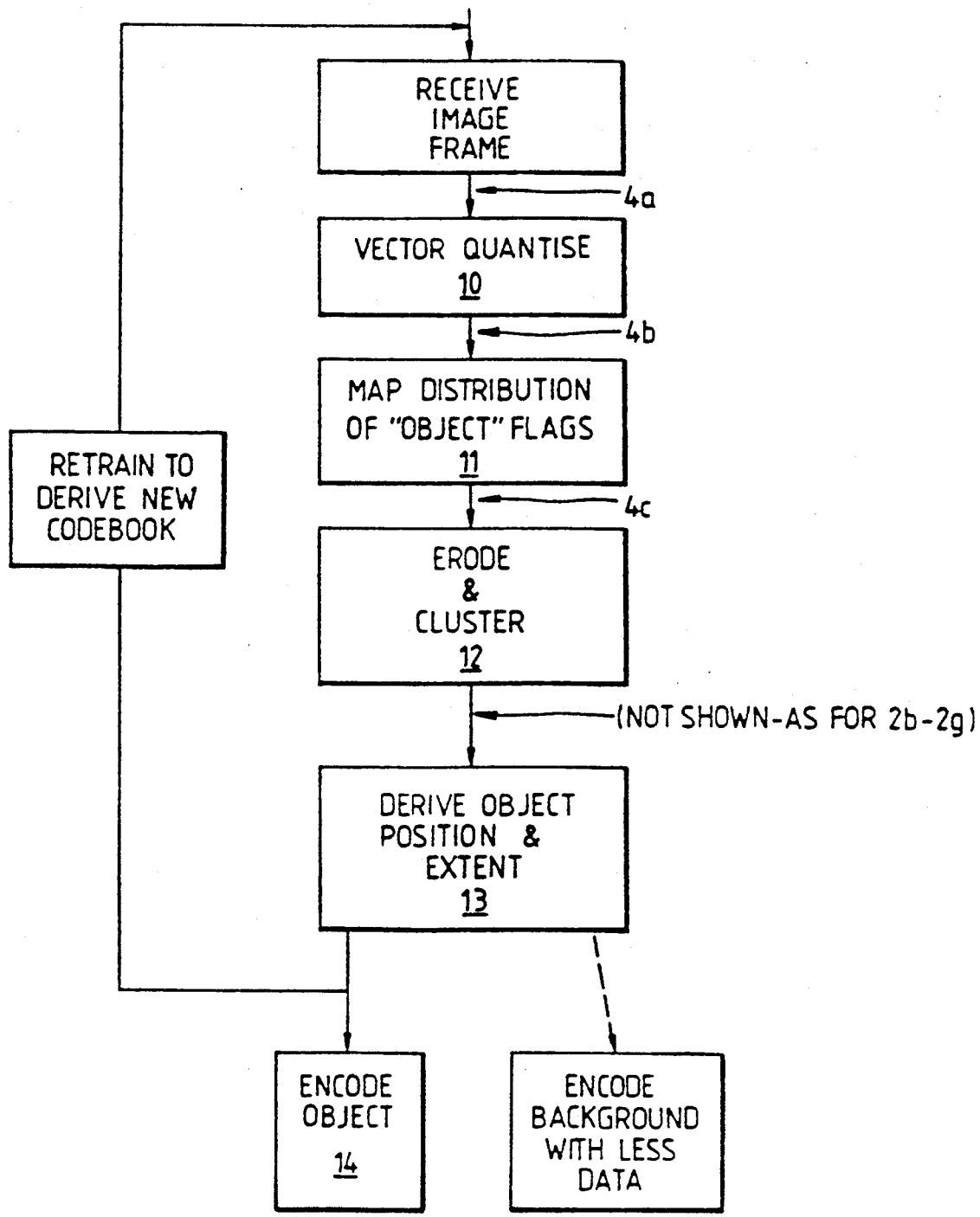

Fig.4.a.
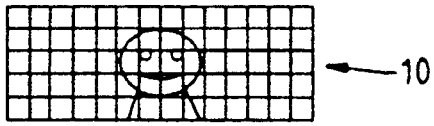
Fig.4.b
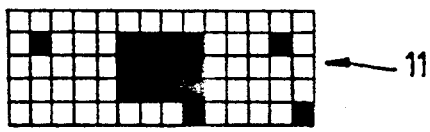
Fig.4.c
■ = VECTOR FLAGGED AS "HEAD".
□ = VECTOR FLAGGED AS "BACKGROUND"
CLUSTERING
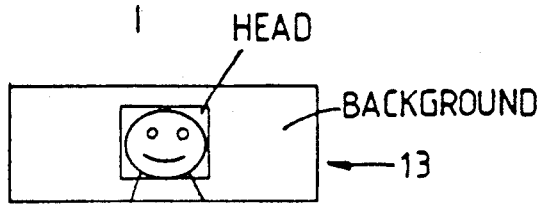
Fig.4.d Fig.5.a
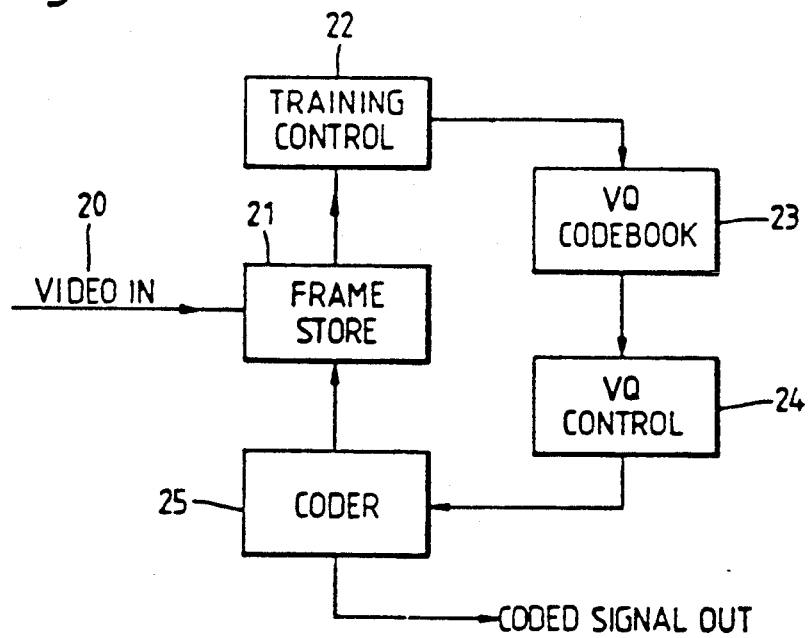
Fig.5.b
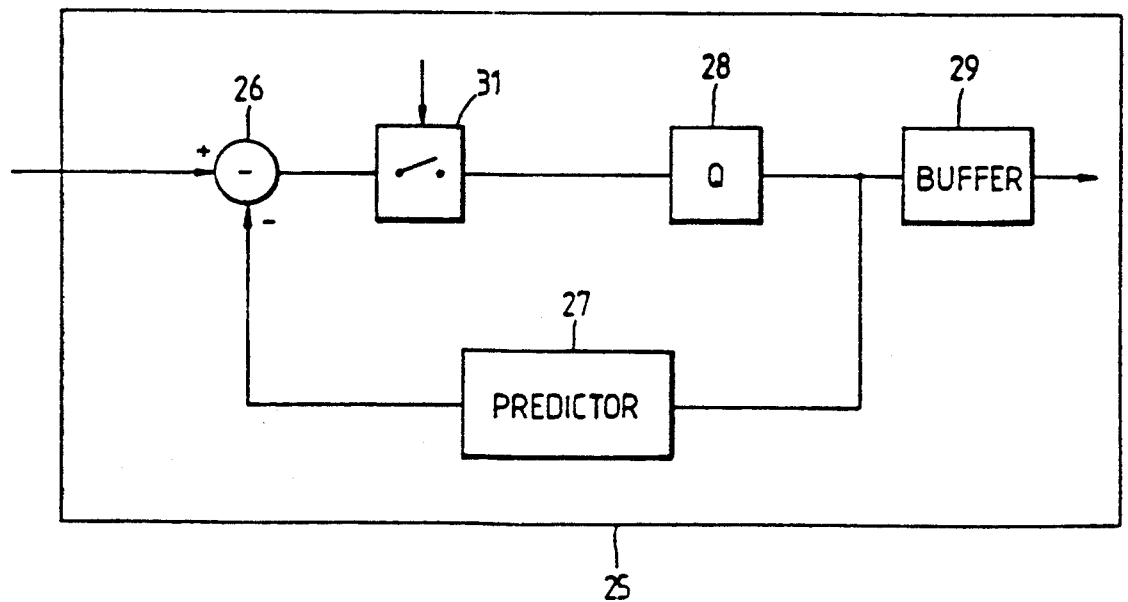

VIDEO IMAGE PROCESSING

This is a continuation of application Ser. No. 295,214, filed Jan. 5, 1989, now abandoned.

FIELD OF THE INVENTION

This invention relates to analysis and processing of video images.

BACKGROUND AND SUMMARY OF THE INVENTION

A video image (which will be understood to encompass frozen images such as facsimile images, in addition to moving images) will in general include at least one object which is of interest and a "background" of lesser interest (and hence of lesser importance).

To analyse the image, e.g. detect the presence/absence or position of a particular object of interest, is often desirable in a variety of applications.

In an image transmission system an improved picture quality might be achieved if data relating to important parts of the scene, i.e. objects of interest, is coded using relatively more bits than data relating to unimportant (i.e. background) parts. For example, in a videophone system a typical image comprises a head and shoulders against a background, and the face area of the head is visually the most important; it is thus desirable to be able to identify the head area from the shoulders and background so as to be able to process the head at a higher refreshment rate than the rest, so that the impression of smooth head motion is conveyed. The ability to locate a head within a head and shoulders scene can thus be used to modify the spatial allocation of video data, enabling a degree of visual importance to be attributed to blocks within the data.

Also, if the position of an object is accurately tracked with time it will be possible to predict its motion, thus allowing "motion compensated" DPCM.

One way of identifying different regions of an image is to utilise the method proposed by Nagao (M. Nagao—"Picture recognition and data structure", Graphic Languages—ed Nake and Rossenfield, 1972). This method has been used in a videophone type system, on an image of a head and shoulders against a background. Some success was achieved in determining the sides of the head when the subject was clean shaven, but very little success was achieved in other cases; so this method is not considered reliable enough for the basis of an area identifying method.

Conventional coders, for instance hybrid discrete cosine transform coders, use no 'scene content' information to code the data within the scene, so each part of the scene is operated on as if it has the same visual importance as every other part.

Other image analysis applications are manifold (for example, in automated manufacturing systems).

It is also known to code video images for transmission using Vector Quantisation (VQ). In VQ coding, the image is represented initially by an array of digital data corresponding to the image frame. Blocks of array points ("sub-arrays") are compared with vectors from a codebook, and the best-marching vector selected using a "least squares" difference criterion. A code designating this vector is then transmitted to represent the sub-array. At the receiving end the indicated vector is selected from an identical codebook and displayed.

The underlying principle of the invention, however, is to use VQ as an identification (e.g. object location) method. The extent of the various aspects of the invention are defined in the claims appended hereto.

The different areas of a video image, when vector quantised (VQ), can be operated on differently provided each entry in the VQ codebook has an associated flag indicating which area that entry represents. So in the example of the videophone two different flag entries are requires, one for the head and the other for the remainder of the scene.

BRIEF DESCRIPTION OF THE DRAWINGS

An embodiment off the invention will now be described by way of non-limitative example concerned with the identification of a head in a head and shoulders against a background scene, with reference to the accompanying drawings in which:

FIGS. 2a-g show schematically various stages in the training sequence used to derive the codebook;

FIG. 3 is a block diagram illustrating the operation of a coder embodying the invention;

FIG. 4a shoes schematically a frame to be analysed;

FIG. 4b illustrates the sub-array blocks used in vector quantising FIG. 4a;

FIG. 4c shows the state of flags corresponding to the vector quantised image of FIG. 4b;

FIG. 4d shows schematically the result of analysing the frame of FIG. 4a according to the invention;

FIGS. 5a and 5b show schematically a coder embodying the invention; and

FIG. 5b schematically shows the differential coder of FIG. 5a in more detail.

DETAILED DESCRIPTION OF THE DRAWINGS

Figure 1:
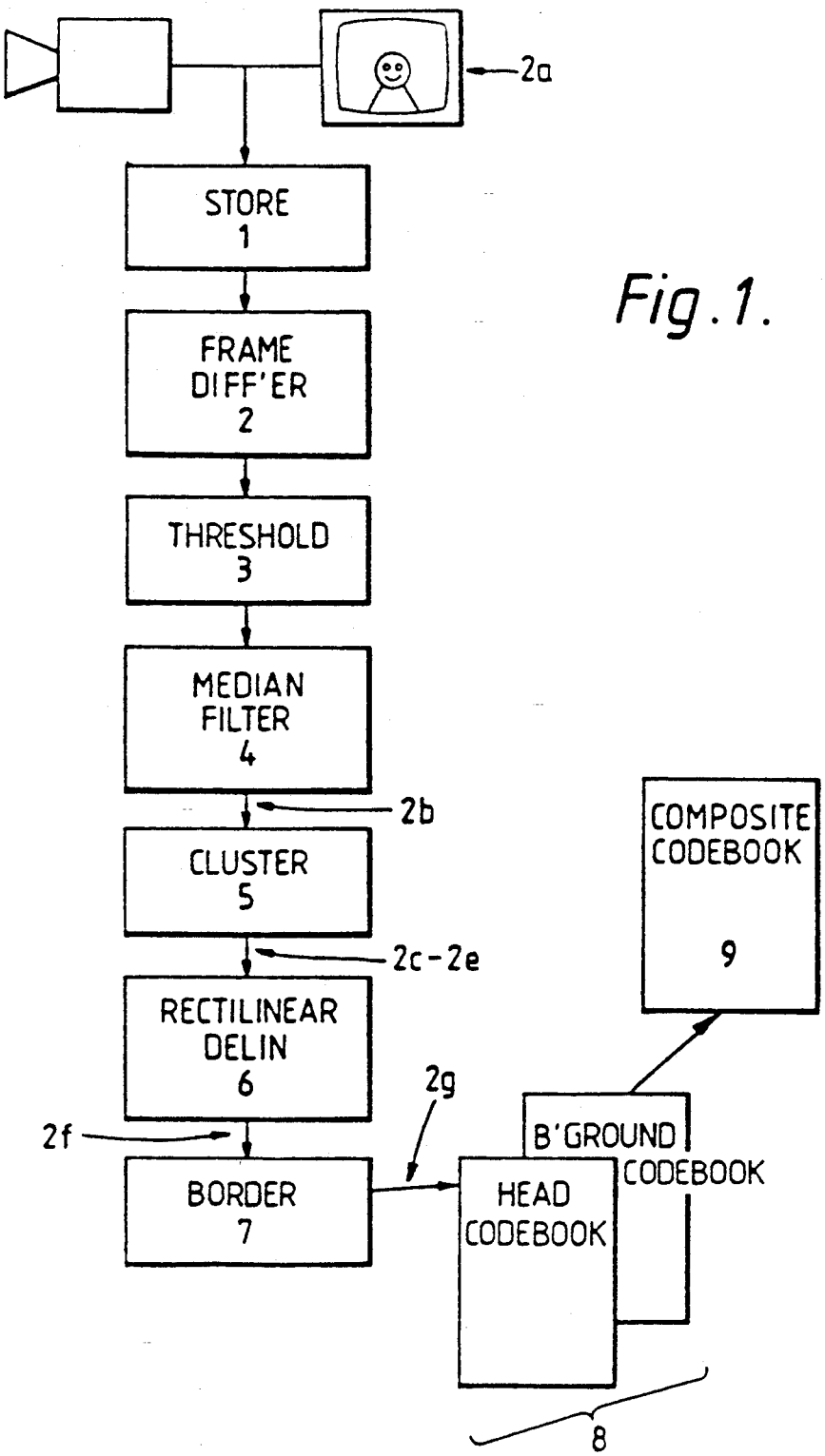
FIG. 1 is a block diagram illustrating the initial stages of operation of parts of a coder embodying the invention.

To enable the invention to operate, it is necessary to have provided a composite codebook which includes vectors flagged as being "head". Preferably others are flagged as being "background". It is possible to derive a "standard" codebook for either an average or a given speaker, but to allow flexibility and greater accuracy of identification, this codebook is derived at the start in an initial "training" sequence. A preferred way of implementing such a sequence will now be described.

To generate "head" and "background" parts of the codebook, it is necessary to unambiguously obtain some "head only" data and "background only" data; a crude initial head detection algorithm is required.

Referring to FIGS. 1 and 2, in order to detect the head, digital data representing several contiguous frames of the head and shoulders image are captured; for instance in a store 1. One of these frames is depicted in FIG. 2a. This data does not need to be extremely accurate, but rather representative.

On the assumption that the prime moving areas within the data sequence are directly associated with the head area, frame differencing 2 is applied to the data representing each adjacent pair of frames. This process typically yields a set of difference data for each adjacent pair representing moving areas together with random noise across the whole image area.

For all picture elements (pels) represented by each set of difference data, each pel above a given threshold value of intensity is set to maximum intensity (255) and each pel below the threshold is set to minimum intensity (0). This 'thresholding' 3 removes a large quantity of the random noise and some of the moving areas.

Median filtering 4 is next applied to each set of difference data, which very effectively removes most of the remaining random noise, but erodes only small amounts of the moving areas.

The image represented by each set of data at this stage will rarely provide a clear outline of the head; unless the head to background contrast is very high and the movement of the head between adjacent frames is more than one pel. Often only one side and the top of the head may be depicted as shown in FIG. 2b.

Generally, the moving areas will be clustered in regions around the head area, but some isolated clusters may arise due to motion in other area of the image. A clustering process 5 is used to remove some of the isolated clusters: two orthogonal histograms are generated, one representing the number of 'moving' pels in the columns of the image represented by the data and one representing the number of moving pels in the rows of the image represented by the data. The first order moments are calculated and the 'centre of gravity' of the image determined, as shown in FIG, 2c. A rectangle is then generated, centred on these co-ordinates, of such dimensions that a given percentage of moving area is included within it, see FIG. 2d. The pels remaining outside this rectangle are set to zero intensity, FIG. 2e. By a suitable choice of rectangle isolated clusters are removed by this process.

Constraints are imposed on the selection of the rectangles in order to reduce the occurrence of incorrect rectangles. Since a very small movement of the head between one frame and the next may produce a very small rectangle, the rate of change of size of the rectangle from one set of data to the next is restricted: either each of the boundary lines of the rectangle are constrained to lie within a small distance of the corresponding boundary in the immediately preceding set of data; or the maximum rate of change of the size of the rectangle is linked to the frame difference energy (e.g. the square of the difference data), so id the difference energy is small the change is kept small, but if the difference energy is large the rate of change may be greater.

The rectangle—rectangles are used because they require very few bits of data to define—is then shrunk if necessary, at 6 in FIG. 1, and as shown in FIG. 2f, to become the smallest rectangle that can be placed around the data to enclose all the remaining non-zero pels. This rectangle is assumed to represent an approximate model of the head.

A border is then created, at 7 in FIG. 1, around the final rectangle, as shown in FIG. 2g. This border defines an exclusion zone form where no data will later be taken. This ensures that when the border is applied to the respective frame of the original image the data inside the border will be exclusively head data and the data outside the border will be exclusively background data.

If five frames of data are initially captured in the store 1, then four adjacent pairs of frames are analysed and four sets of data result. After the four borders have been set 7 the head area data and the background area data are extracted from the first four frames of the original image respectively and the Linde-Buso-Grey algorithm is applied to generate a VQ codebook for each area 8, for example, a 9 bit background codebook and 10 bit head codebook (i.e. codebooks containing respectively $2^9$ and $2^{10}$ entries). The two codebooks are then combined 9 to form one codebook, each entry of which has an associated flag indicating its origin.

Referring now to FIGS. 3 and 4a-d, after this training sequence is completed, the composite codebook is used to locate the head in successive image frames. The VQ coder operates just as it would in a prior art system using VQ as the transmission coding, but for each block of pels coded 10, the code generated will include a flag (for example, the first digit) indicating whether that block is "head" or "background" so that the head position is known for each frame.

It will of course be appreciated that when the codebook is derived at the coder as indicated above, VQ cannot be used as the transmission code (unless this codebook is made known to the decoder first by transmitting an indication of the vectors).

Since the quantisation process is inherently approximate, it will be appreciated that occasionally blocks from the head part of the image may best match a vector from the "background" part of the codebook, or vice versa. The actual identification of the head will thus usually involve ignoring isolated "head" blocks using erosion and clustering 11, 12 (for example, as described above), or designating the area with the highest concentration of "head" blocks as the actual head.

Another method involves detecting "head" blocks and then examining the error between the block and the "head" vector, and that between the block and the best-matching "background" vector, and if the two scores are similar (i.e. there is ambiguity about whether the block is "head" or "background"), reflagging the block to "background" instead.

If the head blocks are too scattered, it may be that the codebook is insufficient to characterise the head. In this case, a retraining sequence may be employed to regenerate the codebook.

This retraining sequence may either simply be a further sequence of the kind described above, or it may attempt to improve (rather than simply redefine) the codebook. For example, a count may be kept of the number of "incorrect" (i.e. scattered) as opposed to "correct" (i.e. concentrated in the head area) occurences of each vector, and the scatter may thus be reduced by rejecting from the codebook vectors which occur incorrectly too often.

Or, alternatively, the approximate head location derived by locating the greatest concentration of "head" blocks may be used, in the same manner as described above, as an area for generating a new "head" codebook.

These latter approaches, in which VQ coder "learns" from each retraining sequence, are preferred on grounds of accuracy.

FIG. 5a shows a clock diagram of a video coding apparatus (e.g. for a video telephone) embodying the invention. Video signals are fed from an input 20 to a frame store 21 where individual picture element values are recorded in respective store locations so that desired sub-arrays of pels are accessible for further processing. The sub-array sizes may typically be $8 \times 8$. In an initial, training, phase of the apparatus a training control unit 22—which may for example be a suitably programmed microprocessor system—carries out the codebook generation method described above, and enters the vectors (and flags) in a VQ codebook store 23. It will be understood that the VQ process involves matching $8 \times 8$ sub-array to the nearest one of the stored vectors, viz. a number of 8×8 patterns which are consistently fewer in number than the maximum possible number ($2^{64}$) of such patterns.

In the coding phase of the apparatus, the matching is carried out by VQ control logic 24 which receives successive sub-arrays from the frame store 21 and compares each of these with all the vectors in the codebook store. The simplest form of comparison would be to compute the mean square difference between the two; the vector giving the lowest result being deemed to be the best match. The output from the VQ control logic is the sequence of flags associated with the vectors thus identified.

The actual logic is carried out in this example by an inter frame differential coder 25, in which an inter-frame difference (in subtractor 26) is taken (in conventional manner) between pels from the frame store 21 and a previous frame predictor 27. As is usual in such systems, a quantizer 28 and an output buffer 29 (to match the irregular rate of data generation to a transmission link operating at a constant rate) are shown. A receiver (not shown) used the difference-information to update a reconstructed image in a frame store. The flag output from the VQ control logic 24 is connected (if required, via erode/cluster circuits 30) to the differential coder 25. When the flag indicates that "head" information is being processed, the coder operates normally. If however "background" is indicated, then the generation of difference information is carried out less frequently (e.g. on alternate frames only). This operation is illustrated by a switch 31 which, when the flag indicates "background", breaks the coding loop on alternate frames.

It will be apparent from the foregoing that any visually distinctive object or objects may be accurately detected, recognised or located using methods according to the invention.

While the invention has been described in connection with what is presently considered to be the most practical and preferred embodiment, it is to be understood that the invention is not to limited to the disclosed embodiment, but on the contrary, is intended to cover various modifications and equivalent arrangements included within the spirit and scope of the appended claims.

I claim:

1. A method of identifying an object against a background within an image array, comprising the steps of:
   a) comparing, using vector comparison, each of a plurality of identically shaped, two-dimensional sub-arrays into which the image array is notionally divided as to object and background, with a plurality of vectors from a set,
   each said set including a subset comprising a plurality of members of said set associated with the object, and
   b) in the event of substantial similarity, labeling that sub-array as corresponding to the object, wherein said plurality of vectors are taken from a codebook which includes a second subset of vectors associated with said object within an image array and a subset of vectors associated with the background with an image array, wherein each vector of each subset has an associated flag indicating which of the object or the background that vector is associated with, so that each sub-array may be labelled as corresponding to the object or to the background by the flag.

2. A method according to claim 1 in which the location of the object is identified by finding within the image array the greatest concentration of sub-arrays labelled as corresponding to the object.

3. A method of detecting a plurality of different objects, according to any one of claim 1 or 2, in which the set includes members associated with each such object.

4. A method of detecting a human head within a video image, employing the method of any one of claims 1 or 2 or 3.

5. A method of encoding a video image signal for transmission comprising the steps of
   a) identifying an area of the video image corresponding to an object of visual importance, using a method according to any one of claims 1 or 2, and
   b) modifying the spatial allocation of coding data so as to preferentially favour that area,
   whereby a greater degree of visual importance may be attributed to that area of the image.

6. A method of encoding a video image signal comprising the steps of:
   a) identifying an area of the video image corresponding to an object of visual importance by repeatedly
      i) comparing a sub-array of the image with vectors from a set including members associated with the object, and
      ii) in the event of substantial similarity, labeling that sub-array as corresponding to the object; and
   b) modifying the spatial allocation of coding data in favor of that area, whereby a degree of visual importance may be attributed to that area of the image;
   wherein the video image signal is encoded so as to update the area corresponding to the object at a higher rate than other areas.

7. A method of generating a set of vectors for use in a method of identifying a moving object by repeatedly
   i) comparing a sub-array of the image with vectors from a set including members associated with the object, and
   ii) in the event of substantial similarity, labeling that sub-array as corresponding to the object; and
   said method of generating a set of vectors comprising the steps of:
   a) identifying an area of the image corresponding to at least a part of the object, and
   b) generating vectors from video-data representing that area of the image, in which the areas of the image corresponding to the object are identified by analyzing the difference between a pair of temporally separated image frames, whereby the object is detected by its movement.

8. An image analyser for identifying an object against a background within an image, comprising vector quantisation means arranged to compare sub-arrays of an image array with vectors from a codebook and select therefrom the most similar vector to each such sub-array, the codebook comprising a subset of vectors associated with the object and a subset of vectors associated with the background, each such vector having an associated flag indicating to which subset it belongs, whereby the analyser may identify the object form the flags of the vectors selected for the sub-arrays.

9. An image analyser according to claim 8, further comprising clustering means for determining the position of a boundary to enclose a given proportion of those sub-arrays flagged as corresponding to the object, whereby the image analyser may identify the position and spatial extent of the object.

10. A coder for encoding video image signals comprising:
   a) an image analyser according to any one of claims 8 or 9 arranged to identify an object within an image, and
   b) an encoder arranged to preferentially allocate video encoding data to the area of the image corresponding to the object.

11. A coder according to claim 10, in which the encoder is arranged to encode the unquantised image.

12. A coder according to claim 11, in which the coder is a discrete cosine transform encoder.

13. A coder according to claim 10, further comprising:
   c) motion analysis means arranged to detect motion of the position of the identified object between temporally separated image frames, and to predict therefrom the position of the object in a subsequent image frame,
whereby the encoder may be a motion compensated DPCM encoder.

14. A coder arranged to employ a method encoding a video image signal comprising the steps of:
   a) identifying an area of the video image corresponding to an object of visual importance by repeatedly
      i) comparing a sub-array of the image with vectors from a set including members associated with the object, and
      ii) in the event of substantial similarity, labeling that sub-array as corresponding to the object; and
   b) modifying the spatial allocation of coding data in favor of that area, whereby a degree of visual importance may be attributed to that area of the image.

15. A coder according to claim 14, also arranged initially to generate vectors of the said subsets of the said codebook, further comprising identification means for identifying an area of the image corresponding to the object or to the background, whereby the respective vectors may be generated from data derived from the said area.

16. A coder according to claim 15 in which the identification means is arranged to anlyse the difference between a pair of temporally separated image frames to identify areas of the image corresponding to the object.

17. A coder according to claim 16, in which the identification means comprises:
   a) means for generating from a pair of frames of the image array elements within a notional two dimensional field, the value of each position within the field indicating whether the difference between the luminance levels of the picture elements at corresponding positions in the two frames lies above or below a threshold; and
   b) clustering means for determining the centre of gravity within the said field of those array elements indicating a deference above the threshold and determining the position of a boundary about the centre of gravity which encloses a given proportion of those array elements,
whereby all picture elements lying within a boundary so determined are identified as belonging to an area of the image corresponding to the object.

18. A coder according to claim 17 which means further comprises filtering means for median filtering the array elements within the notional two dimensional field prior to the determination of the centre of gravity.

19. A coder according to claim 17, wherein said boundary about the centre of gravity is of a finite number of elements in thickness.

20. A coder according to claim 17, wherein said boundary about the centre of gravity is of rectangular shape.

21. A coder according to claim 20, wherein the rectangular shaped boundary is centred upon the centre of gravity and each side of the rectangle is moved inward, if possible, until it abuts at least one of those array elements indicating a difference above the threshold.

* * * * *